L. B. DE HYMEL.
NON-SKID AND TRACTION BAND FOR LAWN MOWER WHEELS.
APPLICATION FILED DEC. 8, 1919.
1,382,067.
Patented June 21, 1921.
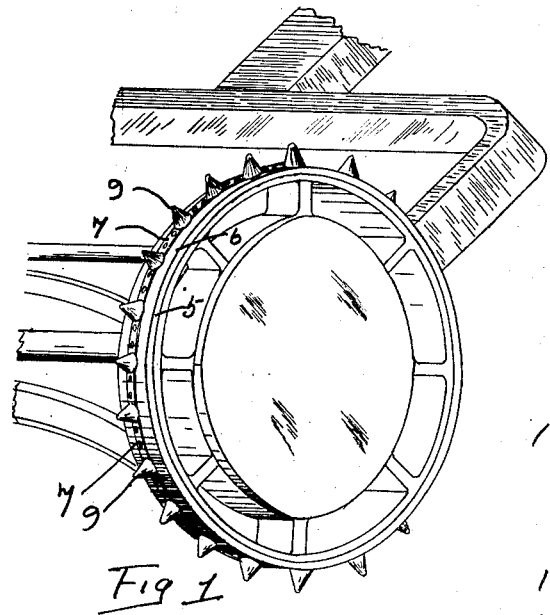
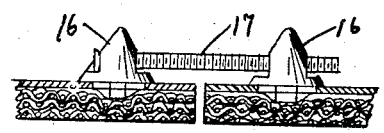
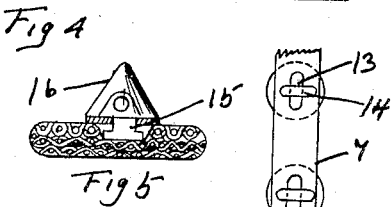
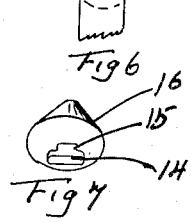
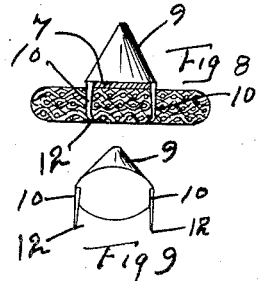
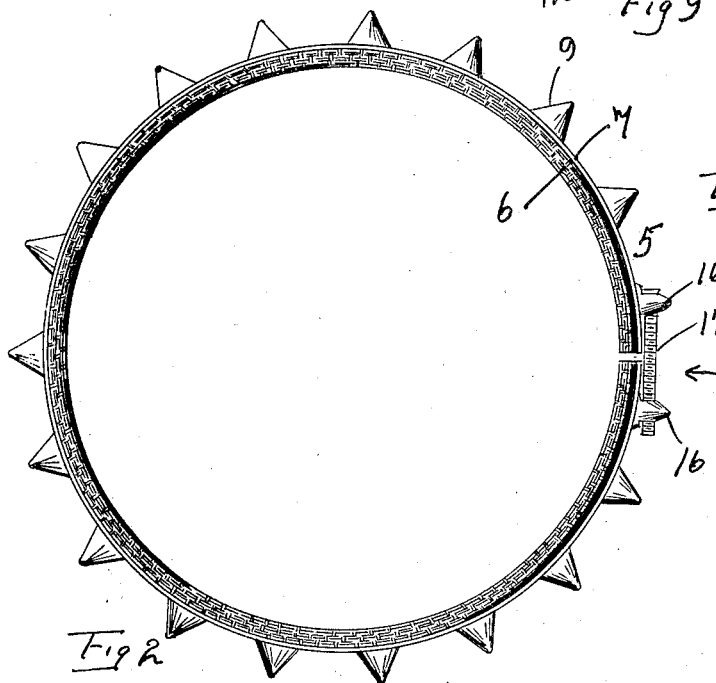
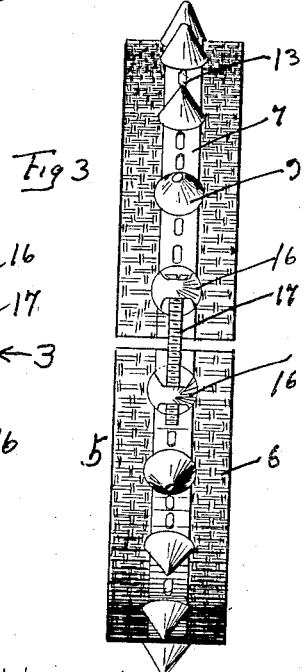
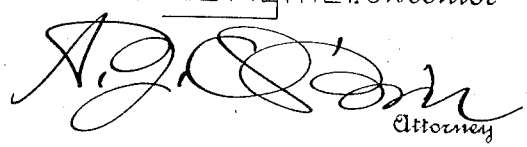
Leo B. DeHymel, Inventor

UNITED STATES PATENT OFFICE.

LEO B. DE HYMEL, OF DENVER, COLORADO.

NON-SKID AND TRACTION BAND FOR LAWN-MOWER WHEELS.

1,382,067.  Specification of Letters Patent.  Patented June 21, 1921.

Application filed December 8, 1919. Serial No. 343,331.

*To all whom it may concern:*

Be it known that I, LEO B. DE HYMEL, a citizen of the United States, residing at the city and county of Denver and State of Colorado, have invented certain new and useful Improvements in Non-Skid and Traction Bands for Lawn-Mower Wheels; and I do declare the following to be a full, clear, and exact description of the invention, such as will enable others skilled in the art to which it appertains to make and use the same, reference being had to the accompanying drawings, and to the characters of reference marked thereon, which form a part of this specification.

My invention relates to improvements in traction bands, more especially designed for use in connection with the ground wheels of lawn mowers; and while the device is extremely advantageous in connection with this class of machines, it may of course be employed in all cases where increased traction is desirable, particularly on the ground wheels of small, hand-operated machines.

I have found in using a lawn mower that the knives very frequently become clogged due to the working of material in between the stationary blade and the rotary knives, with the result that the ground wheels of the machine are locked and slide over the grass, so that the knives fail to perform their function.

My improvement is intended to overcome this difficulty, and to this end it consists of a flexible band provided with cone-shaped studs which are adapted to enter the ground, as the sod of the lawn, with the result that the necessary traction is obtained to prevent clogging of the knives, while the peculiar shape of the studs prevents the injurious tearing up of the sod. This is due largely to the peculiar shape of the studs, the points of the cone-shaped devices penetrating but not tearing the ground or sod of the lawn.

My improved traction band is composed of some suitable, flexible material, as a heavy canvas or woven cord, combined with a metal tape preferably of less width than the canvas portion of the band, and held in place thereon by the conical studs, whose bases engage the metal tape and are provided with prongs which clench into the band on opposite sides of the metal member. Near the extremities of the band are located two studs having shanks which pass through elongated openings in the tape, and after a quarter-turn are locked in place and positively secure the tape against longitudinal movement on the canvas or woven-cord member. These two end studs are perforated, one of the perforations being threaded to receive a tightening screw, whereby the band may be securely locked in place upon the tread of the wheel.

Having briefly outlined my improvement, I will proceed to describe the same in detail, reference being made to the accompanying drawing, in which is illustrated an embodiment thereof. In this drawing:

Figure 1 is a fragmentary perspective view of a lawn mower, showing my improved non-skid traction band applied to one of the wheels thereof.

Fig. 2 is a side elevation of the band shown in detail and on a larger scale.

Fig. 3 is an elevation looking at the band flatwise and in the direction of arrow 3, Fig. 2.

Fig. 4 is a fragmentary longitudinal sectional view of the band, showing its extremities, together with the securing studs and adjusting screw.

Fig. 5 is a cross-section of the same.

Fig. 6 is a fragmentary, underneath view of the metal tape, illustrating the manner of locking the terminal studs therewith.

Fig. 7 is a perspective view of one of the terminal studs.

Fig. 8 is a cross-section of the band, cutting the same where one of the ordinary traction studs is located.

Fig. 9 is a perspective view of one of these studs.

The same reference characters indicate the same parts in all the views.

Let the numeral 5 designate my improved non-skid traction band considered in its entirety, and consisting of a body or main canvas member 6, a metal tape member 7, and a series of cone-shaped studs 9. The metal tape member 7 is preferably considerably narrower than the canvas or fibrous member 6 and centrally located longitudinally or circumferentially thereon. The bases of the cone-shaped studs 9 directly engage the thin metal member 7 and project slightly therefrom on opposite sides, the studs being provided with brads 10, which penetrate the member 6 and whose extremities are upset or bent as shown at 12, whereby the studs are clenched within the canvas member is securing relation. As the brads are arranged on opposite sides of the metal tape member 7, the latter is secured in place against lateral movement on the canvas member. The metal member 7 is provided with slots or elongated openings 13, which extend longitudinally of the tape member 7 and are adapted to receive the head 14 of a T-shaped shank 15, with which two terminal studs 16 are provided. In applying the studs 16 to the band, the heads 14 are positioned longitudinally of the tape and inserted in two of the slots 13, close to the extremities of the band. These studs are then given a quarter-turn, whereby the heads of the shanks extend at right angles to the direction of the slots 13, whereby they are locked securely in place until given a quarter-turn. The two studs 16 are perforated to receive an adjusting screw 17. One of the perforations being smooth, and the other threaded to coöperate with the threads of the screw.

In making my improvement, I prefer to form the band in relatively long lengths and to provide the metal tape member 7 with slots 13 throughout its length. This band may then be cut into lengths or sections of suitable size to fit wheels of varying diameter. I then remove two of the ordinary studs 9, being the ones nearest the extremities of the band, and substitute two of the studs 16 which are placed in the perforations 13 nearest the ends of the section to be applied to any wheel. The T-shaped shanks of the studs 16 are then passed through the perforations 13 of the metal tape 17 and given a quarter-turn to lock them in place. Their perforations are then in position to receive the adjusting screw 17, which, when applied, locks the band securely in place upon the tread of the wheel.

The metal tape member of the band makes the latter non-elastic or unstretchable. This feature makes it impossible for the traction band to become loose after being placed in position on the tread of a wheel.

The canvas member 6 may be composed of any suitable woven fabric which is sufficiently strong and durable for the purpose. This material is sufficiently compressible to make it practicable to insert the T-shanks, which are very short, without cutting away any of the material of the woven band. This is illustrated in Figs. 4 and 5.

My improved traction band is exceedingly efficient for the purpose intended, as heretofore indicated. It gives the treads of the ground wheels of the lawn mower, one on each side, sufficient traction to make it practicable to operate the machine under all circumstances, whether the grass is wet, extremely dry, or tall, since it absolutely prevents the clogging or interruption of the rotary movement of the revolving knives. Furthermore, it is not necessary that the machine should be operated at great speed, as is usually required where the ground wheels are not supplied with my traction member. When thus supplied, a machine may be moved slowly without danger of clogging. Furthermore, the machine may be operated upon hillsides or terraces of the usual inclination, since the traction band in cases of this character performs the non-skid function, thus making it practicable to run the machine lengthwise on the incline of a terrace or hillside, instead of moving it either up or down the terrace, as is usually required where the treads of the wheels are not especially equipped.

Again, my improvement makes it practicable to adjust the stationary blade and the rotary cutters so that they shall be in any desired proximity for proper coöperation, without any danger of clogging or stopping the regular rolling movement of the ground wheels. Furthermore, as heretofore indicated, the special conical construction of the studs with their points outermost prevents any tearing up of the lawn during the operation of the machine.

I claim:

1. The combination with a ground wheel provided with a band, having conical studs projecting from its outer surface, and means for securing the band in place upon the tread of the wheel, comprising an adjusting screw, the two terminal studs being perforated to coöperate with said screw.

2. A non-skid traction band for ground wheels, comprising a stretchable body member, a metal tape applied exteriorly thereto, studs applied to the tape and having brads clenched into the body member on opposite sides of the tape.

3. A non-skid traction band for ground wheels, comprising a stretchable body member, a metal tape applied exteriorly thereto, studs applied to the tape and having brads clenched into the body member on opposite sides, specially constructed terminal studs, and adjusting means for connecting the latter to secure the band in place upon the wheel tread.

4. A non-skid traction band, comprising a fibrous body member, a metal band secured upon said member, and studs projecting outwardly from the outer surface of the band, the said parts being securely connected in coöperative relation.

5. A band of the class described, comprising a fibrous body member, a thin metal member applied thereto exteriorly, studs applied to the metal member and having brads which enter the body member on opposite sides of the studs, terminal studs detachably applied to the band, and an adjusting screw engaging said terminal studs, the latter being perforated to coöperate with the screw.

In testimony whereof I affix my signature.

LEO B. DE HYMEL.